RE 24886

April 7, 1959　　　L. E. AUSTIN ET AL　　　2,880,824
BRAKE MECHANISM

Filed Jan. 30, 1956　　　　　　　　　　2 Sheets-Sheet 1

INVENTOR
LEONARD E. AUSTIN
ARTHUR K. BROWN, JR.
BY
H. O. Clayton
ATTORNEY

April 7, 1959  L. E. AUSTIN ET AL  2,880,824
BRAKE MECHANISM

Filed Jan. 30, 1956  2 Sheets-Sheet 2

INVENTOR
LEONARD E. AUSTIN
ARTHUR K. BROWN, JR.
BY
H. O. Clayton
ATTORNEY

United States Patent Office

2,880,824
Patented Apr. 7, 1959

2,880,824

BRAKE MECHANISM

Leonard E. Austin and Arthur K. Brown, Jr., South Bend, Ind., assignors to Bendix Aviation Corporation, South Bend, Ind., a corporation of Delaware Application January 30, 1956, Serial No. 562,270

1 Claim. (Cl. 188—78)

This invention relates to brakes and is illustrated as embodied in an internal expanding brake for an automotive vehicle.

It is an object of our invention to provide a simple and inexpensive means for holding the shoes of said brake against movements which would automatically result in noise or rattle; and further to provide such means which may be readily assembled or disassembled.

One of the principal objects of our invention is to provide a brake shoe hold down means which may be readily assembled by a power operated mechanism during the operation of said mechanism in assembling the entire brake unit.

It is a further object of our invention to provide, in a brake unit, a simple brake shoe steady rest or hold down means for limiting relative movement of two members of said unit and for positioning the shoe laterally in its relation to other parts of the brake unit; and it is another object of our invention to provide a brake shoe hold down means accomplishing the aforementioned results without, however, impairing the effectiveness of the brake shoe in the operation of the complete braking unit.

Other objects of the invention and desirable details of construction of parts will become apparent from the following detailed description of certain illustrative embodiments of the invention, taken in conjunction with the accompanying drawings illustrating said embodiments, in which.

Figure 1:
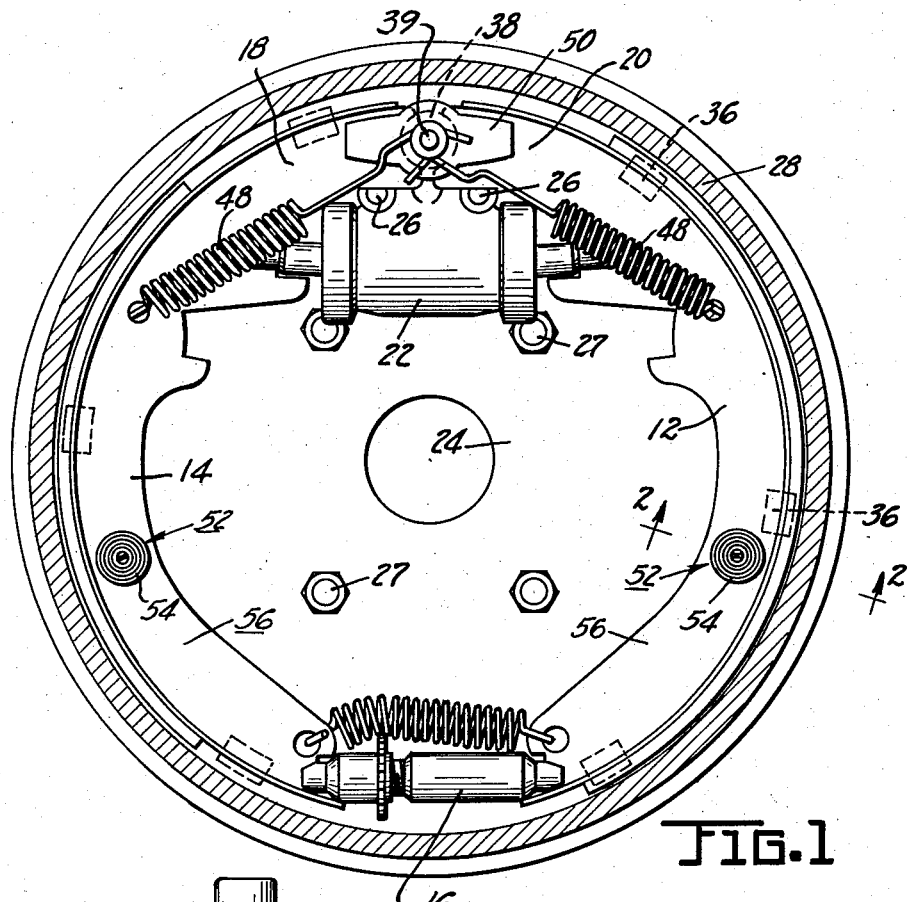
Figure 1 is a side elevation of a brake shoe assembly disclosing our invention applied thereto.

Describing now the preferred embodiment of our invention there is disclosed in Figure 1 a brake unit including the steady rest or hold down mechanism of our invention. This brake unit is disclosed and claimed in U.S. patent application Serial No. 457,815 filed September 23, 1954, now abandoned, and includes a pair of articulated T-section brake shoes 12 and 14 which are interconnected at one end thereof by an adjustable strut 16. Ends 18 and 20 of the brake shoes are spread apart by a fluid motor 22 which is secured to a backing plate 24 by means of fastening devices 26. The backing plate is attached to a fixed part of the vehicle by means of fastening members 27. The shoes, mounted alongside the backing or support plate 24, are expanded by the fluid motor to engage the cylindrical surface of a rotatable drum 28 which is secured to a movable part of he vehicle, as for example, a wheel member 29, Figure 2.

Figures 2, 3:
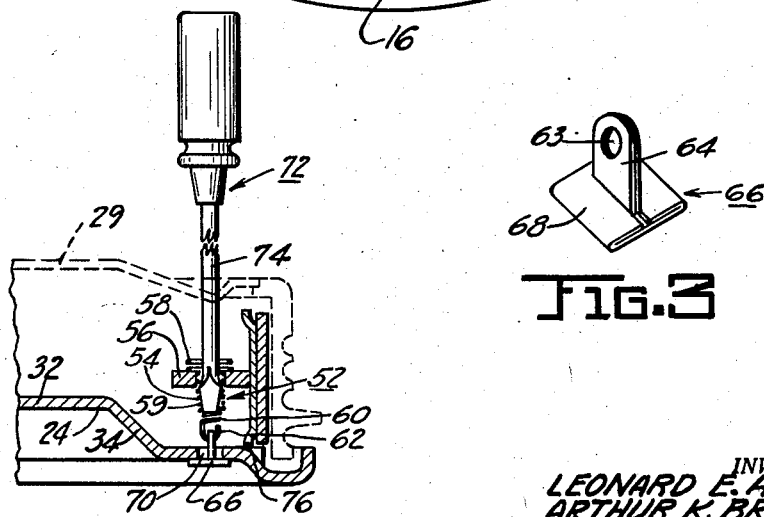
Figure 2 is a sectional view taken on the line 2—2 of Figure 1, disclosing the details of a preferred embodiment of the steady rest mechanism of our invention.
Figure 3 is a perspective view of the anchor means of the mechanism of Figure 2.
Figure 4:
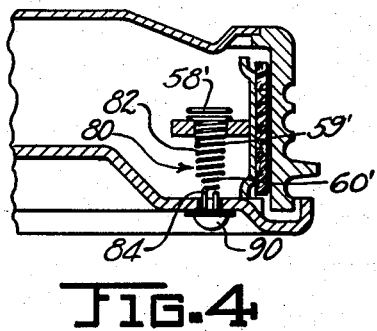
Figure 4 is a view, similar to Figure 2, disclosing another embodiment of the steady rest mechanism of our invention.

The support plate 24 has a flat, disk-like center portion 32 and an axially offset periphery 34, Figure 2. A plurality of indentations 36 are formed in the outer periphery of the support plate which provide ledges serving to locate the brake shoes which are drawn into contact with said ledges by the hold down means of our invention.

The operation of the brake is evident from the foregoing description; however, a short summary of a brake application will be given. Assuming counterclockwise drum rotation in Figure 1, the operator's applying effort will spread the shoe ends 18 and 20 apart engaging the shoes with the drum 28. The two shoes will both anchor on shoe end 20 against a boss portion 38 pressed out from the plate 24. When the brake is released, one of the return springs 48 urges shoe end 18 into abutment with the boss portion 38. The springs 48 are secured to the brake shoes and to a post 39 which is secured to the boss 38. A guide plate 50 mounted on the post 39 serves to help position the brake shoes in place.

Our invention lies in the provision of a simple yet effective shoe hold down mechanism disclosed in detail in Figures 2 and 3 and indicated as a whole by the reference numeral 52, Figures 1 and 2. Such a mechanism is necessary to correctly position the shoes with respect to the other elements of the brake mechanism, particularly the backing plate 24 thereof; and to provide means for preventing undesirable movements of the shoe, that is movements which would cause the brake to rattle. This hold down mechanism, there being preferably one for each of the shoes, includes a coil type spring 54 adapted to be mounted in the web 56 of the shoe and extending laterally between said web and the offset peripheral portion 34 of the backing plate. As is disclosed in Figure 2, the inner coils 58 of the spring, say two of them, are of a relatively large diameter and are adapted to contact a side face of the shoe web 56. The coils of a body portion 59 of the spring are of a lesser diameter than the aforementioned coil section 58 and said body portion extends through an opening in the web. The coil section 58 constitutes one end of the spring and the other end 60 of said spring is made up of a plurality of coils of a diameter less than the diameter of the body portion 59; and said end portion 60 terminates in a hook-shaped fastening member 62.

This hook member 62 is adapted to fit within an opening 63 in an eye member 64, Figure 3, of an anchor member indicated as a whole by the reference numeral 66. The eye member 64 extends in a plane normal to the plane of a base portion 68 of the anchor member; and as disclosed in Figure 2, said eye member is inserted through an opening 70, preferably circular in outline, in the backing plate 24. A tool, which may be a screw driver 72, may be employed to assemble the two parts of the hold down unit of our invention, that is the spring and the anchor. In this operation the anchor 66 is held in place, the eye portion 64 extending through the opening 70; and the spring 54 is then inserted in the opening in the web 56 so that the coil section 58 seats against the shoe web; then if a screw driver type of tool is used a shank portion 74 thereof is inserted within the bore portion provided by the several coils of the spring the end of the tool seating on one end of the coil section 60. The spring is then stretched so that the hook 62 on the end thereof may be interlocked with the eye 64. With the withdrawal of the tool the stretched spring then functions to draw the brake shoe laterally until an edge portion 76 of the rim of the shoe contacts one of the ledge members 36. As to the assembly of the hold down parts, that is the spring and anchor, we prefer, however, to accomplish this by the power operated mechanism disclosed in U.S. patent application Serial No. 690,839, filed October 17, 1957.

Figure 5:
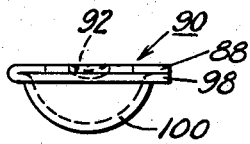
Figure 5 is a side elevational view of the anchor member of the mechanism of Figure 4.
Figure 6:
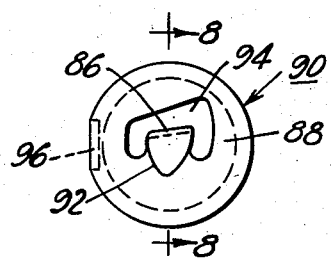
Figure 6 is a bottom plane view of the anchor member of the mechanism of Figure 4.
Figure 7:
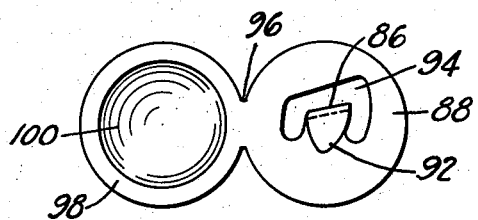
Figure 7 is a view disclosing details of the two parts of the anchor of Figure 4 before the same is folded into a single unit.
Figure 8:
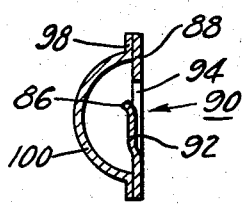
Figure 8 is a sectional view of the anchor member of Figure 4 said section being taken on the line 8—8 of Figure 6.

There is disclosed, in Figures 4 to 8 inclusive, another embodiment of the hold down mechanism of our invention. This embodiment, indicated as a whole by the reference numeral 80, Figure 4, includes a spring 82 which duplicates the spring 54 of Figure 2 save for the construction of the fastening member on the end of the spring; for in the embodiment disclosed in Figure 4 this fastening member is a loop member 84. Those parts of the spring 82 which duplicate the parts of the spring 54 are given the same reference numeral as the latter parts with the addition of a prime. The loop 84 is adapted to loop over a tab 86 constituting a part of a disk-shaped base portion 88 of an anchor member 90. As disclosed in Figure 5, the tab 86 is located at the base of a tongue-shaped portion 92 which is integrally secured to, that is merges with, the body of the disk portion 88. The tongue 92 extends within, that is constitutes one side of, an irregularly shaped opening 94 in the disk 88 thereby making it possible for the loop member 84 to be positioned over the tab 86. The disk 88 is secured, by a connection portion 96, with saucer-shaped cap member 98, Figures 5, 7 and 8, and the anchor unit disclosed in Figures 5, 6 and 8 is completed when the disk and cap parts disclosed in Figure 7 are folded into a back to back relationship. A dome portion 100, Figure 7, of the cap 98 provides a recess within the anchor to house the loop 84 positioned over the tab 86.

As with the preferred embodiment of our invention disclosed in Figures 2 and 3 the embodiment of Figures 4 to 7 is preferably assembled by means of the power operated mechanism disclosed in the aforementioned application.

There is thus provided a simple, easily serviced and easily assembled and disassembled brake shoe hold down mechanism operable to properly position and hold the brake shoe within the brake unit.

While preferred embodiments of our invention have been described in considerable detail, we do not wish to be limited to the particular construction shown which may be varied within the scope of the invention, and it is the intention to cover hereby all adaptations, modifications and arrangements thereof which come within the practice of those skilled in the art to which the invention relates.

We claim:

A brake having a support plate and a plurality of shoes mounted alongside said plate, each of said shoes having a web provided with an opening therein positioned opposite an opening provided in the support plate, a yieldable hold down means extending between the shoes for limiting relative movement between the shoes and the plate and for correctly positioning said shoes with respect to said plate, said means including, for each shoe, the combination of an unobstructed multi-diametered tapered coil spring having some of the large top coils thereof mounted in the opening in the web portion of the shoe and larger ones of the top coils mounted on the drum side of the web, said spring also having a fastening member terminating the small diametered coiled end portion of the spring, an anchor member loosely mounted in the opening in the support plate, said anchor member having a fastening means formed integral therewith to cooperate with the coil fastening member when the hold down means is assembled in place by a removable power operated member passing through the large spring coils in the web and engaging the small spring coils adjacent the anchor member.

References Cited in the file of this patent

UNITED STATES PATENTS

| | | |
|---|---|---|
| 539,400 | Adams | May 21, 1895 |
| 1,624,562 | Ronci | Apr. 12, 1927 |
| 1,954,538 | Sanford | Apr. 10, 1934 |